United States Patent [19]
Ushio et al.

[11] Patent Number: 5,282,273
[45] Date of Patent: Jan. 25, 1994

[54] ENTERPRISE INFORMATION SYSTEM HAVING THREE LEVEL HIERARCHY OF DATA BASES AND COMMUNICATION PATHS

[75] Inventors: Tetsuya Ushio, Yokohama; Sadamichi Mitsumori, Hachioji; Hiroshi Yajima, Amagasaki; Osamu Chinone, Tokyo; Isoji Tabushi, Kamakura; Osamu Akita; Tetsushi Tomizawa, Urawa; Yoshiya Nakatani, Chiba; Yuji Ogiwara, Tokyo; Nobuyuki Ishimoto, Koshigaya, all of Japan

[73] Assignee: Hitachi, Ltd., Tokyo, Japan

[21] Appl. No.: 60,671

[22] Filed: May 13, 1993

Related U.S. Application Data

[63] Continuation of Ser. No. 492,558, Mar. 12, 1990, abandoned.

[30] Foreign Application Priority Data

Mar. 15, 1989 [JP] Japan .................................. 1-062707

[51] Int. Cl.⁵ .......................................... G06F 13/00
[52] U.S. Cl. ...................................... 395/325; 395/200; 395/800; 364/DIG. 1; 364/240.2; 364/228.1; 364/282.1; 364/222.2; 364/284; 364/284.4
[58] Field of Search ............... 395/200, 600, 325, 725, 395/800

[56] References Cited

U.S. PATENT DOCUMENTS

| | | | |
|---|---|---|---|
| 4,805,134 | 2/1989 | Calo et al. | 395/600 |
| 4,958,283 | 9/1990 | Tawara et al. | 364/200 |
| 5,019,963 | 5/1991 | Alderson et al. | 364/DIG. 1 |
| 5,021,949 | 6/1991 | Morten et al. | 364/DIG. 1 |
| 5,036,314 | 7/1991 | Barillari et al. | 340/717 |

*Primary Examiner*—Eddie P. Chan
*Attorney, Agent, or Firm*—Kenyon & Kenyon

[57] ABSTRACT

An enterprise information system in which personal work stations, personal data bases which are held in the work stations, a processor only for use in a division, and intradivision data and interdivision data which are held in the processor are provided. An informal communication path directly connects the work stations in an enterprise among the divisions and an intradivision formal communication path mutually connects the work station in the division to the processor to hold the intradivision data base or the interdivision data base corresponding to the division or both of them. An interdivision formal communication path mutually connects the processors to hold the interdivision data bases. The intradivision data base can only be accessed by the intradivision formal communication path of the division.

10 Claims, 14 Drawing Sheets

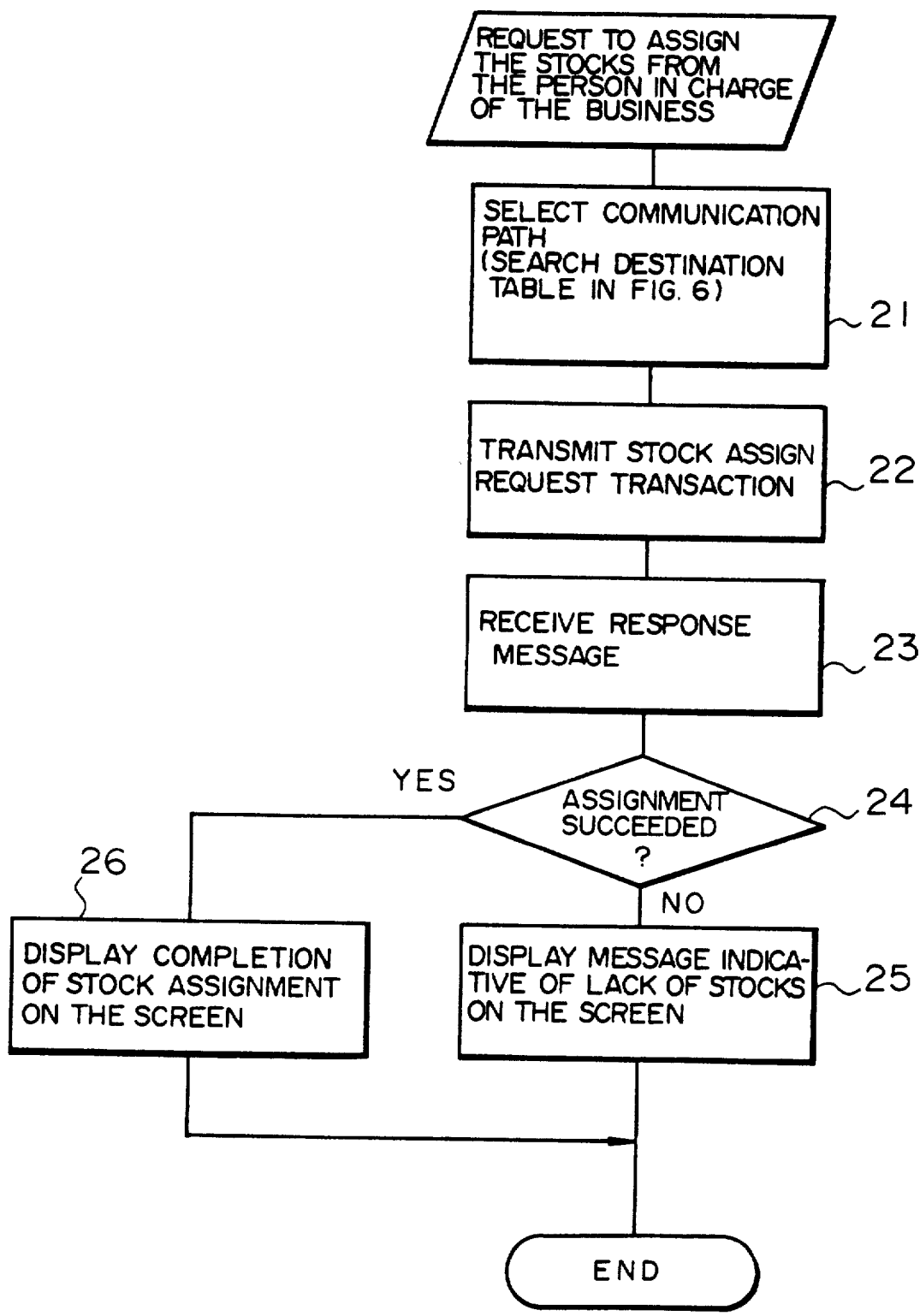

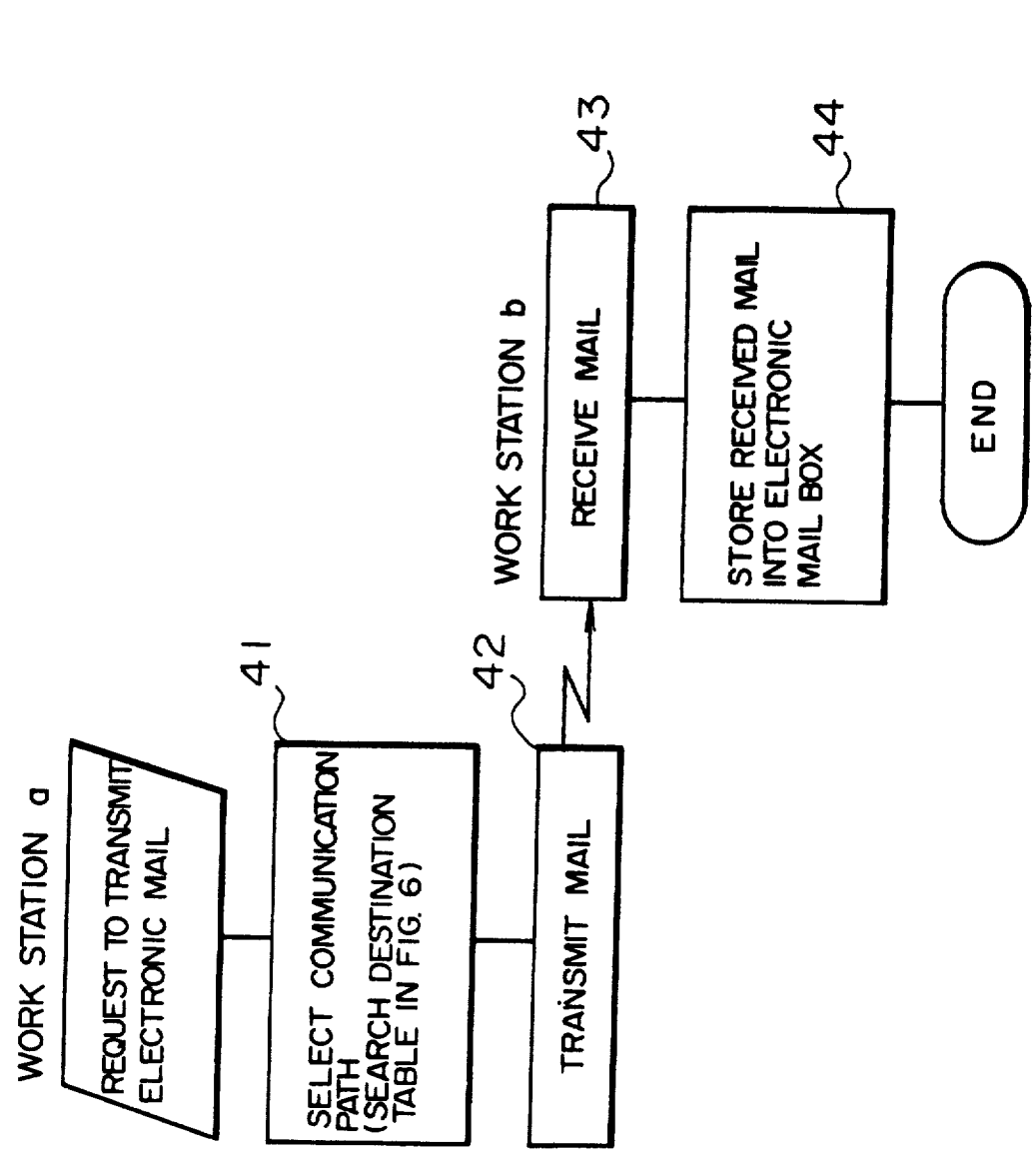
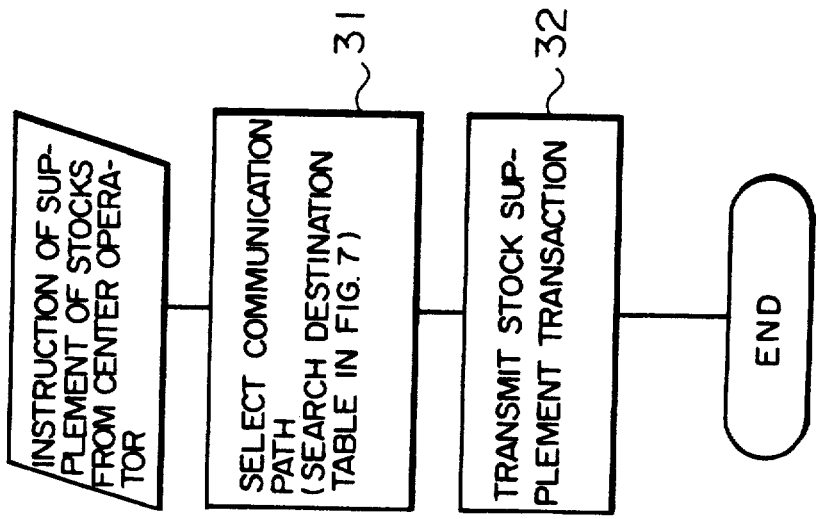

FIG. 6

| TRANSMISSION DESTINATION | LINE ADDRESS | TRANSMISSION DESTINATION ADDRESS | KIND OF TRANSMISSION DESTINATION |
|---|---|---|---|
| STOCK DB MANAGING SYSTEM | 5 | 0 0 1 | HOST |
| ELECTRONIC NOTICE BOARD | 5 | 0 0 2 | HOST |
| WORK STATION a | 4 | 0 0 1 | WORK STATION |
| WORK STATION b | 4 | 0 0 2 | WORK STATION |
| | | | |
| | | | |

FIG. 7

| TRANSMISSION DESTINATION | LINE ADDRESS | TRANSMISSION DESTINATION ADDRESS | KIND OF TRANSMISSION DESTINATION |
|---|---|---|---|
| A BUSINESS OFFICE | 6 | 0 0 1 | HOST |
| B BUSINESS OFFICE | 6 | 0 0 2 | HOST |
| WORK STATION C | 5 | 0 0 3 | WORK STATION |

F I G. 12
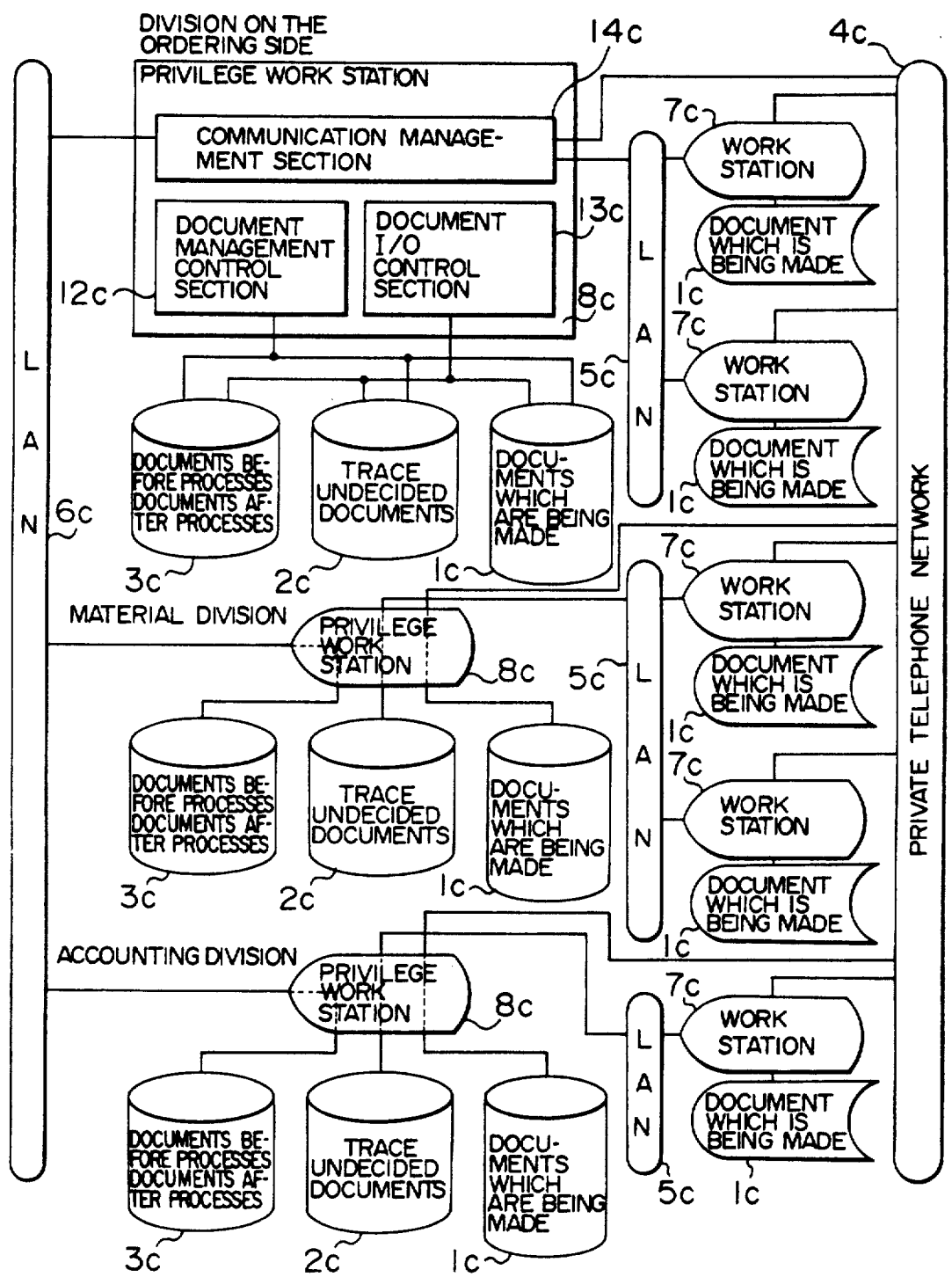

F I G. 15
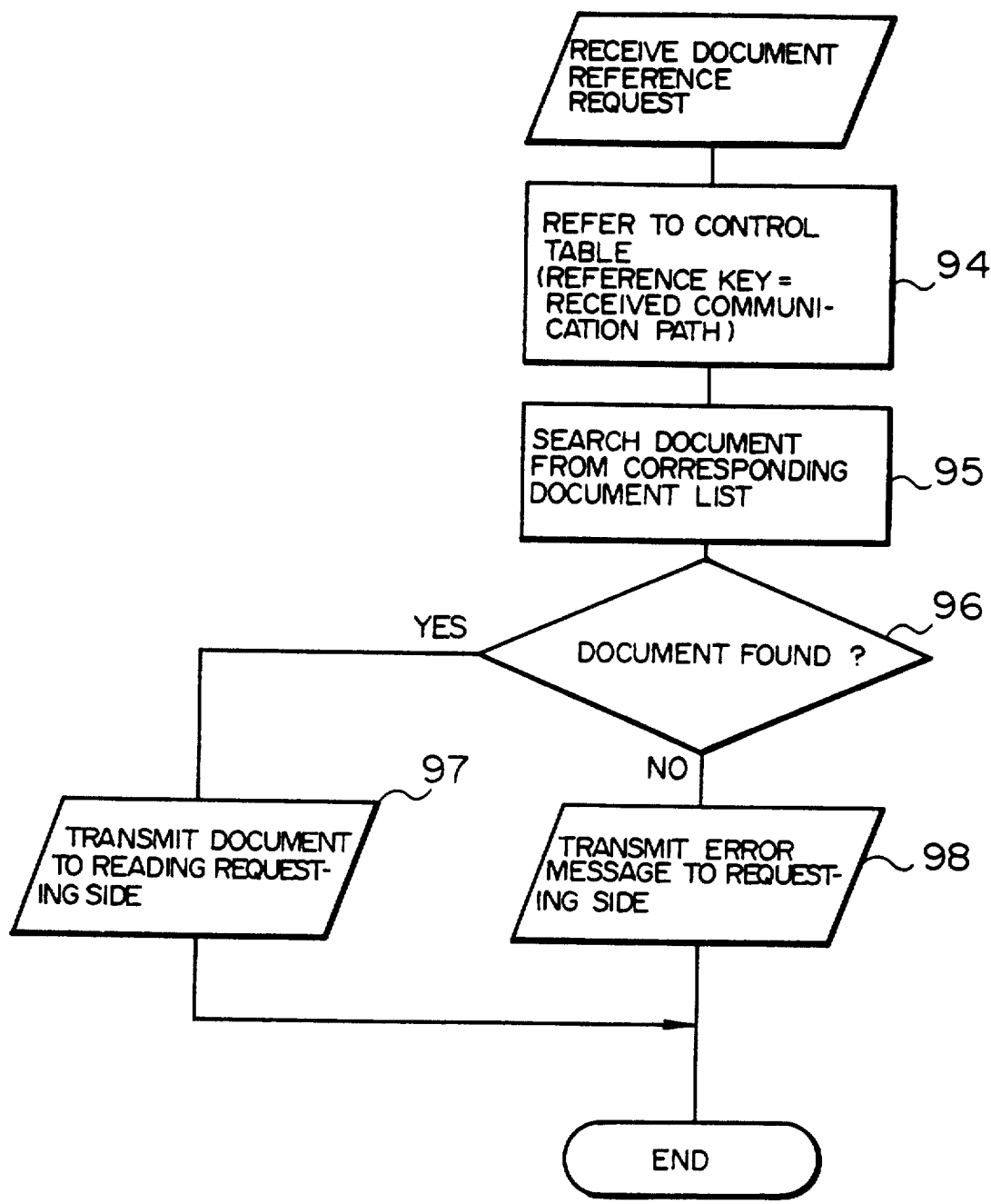

ENTERPRISE INFORMATION SYSTEM HAVING THREE LEVEL HIERARCHY OF DATA BASES AND COMMUNICATION PATHS

This application is a continuation, of application Ser. No. 07/492,558, filed on Mar. 12, 1990, now abandoned.

BACKGROUND OF THE INVENTION

The present invention relates to an enterprise information system and, more particularly, to an enterprise information system which is suitable to manage flows of information between divisions in an enterprise, between an organization and a person in charge, and the like.

In a conventional enterprise information system, an application system is individually constructed for every division. However, in recent years, there is a tendency of integratedly managing various information in enterprise. As one of the measures, there is a tendency of connecting work stations by a single communication path.

With respect to a network, for instance, a form in which an enterprise LAN and a division LAN (or floor LAN) are connected by gates is widely known. However, such a form merely relates to a wiring problem. If such a form is seen from the work station, a single logic communication path in which the enterprise LAN and the division LAN are integrated is merely seen.

As a well-known example of a system in which work stations are connected by a single communication path, for instance, there can be mentioned an enterprise information communication network to an intelligent building which has been disclosed in "VAN LAN Use Strategy", published by Urban Produce Publishing Division, 1987, pages 642 to 644. The above technique intends to connect divisions in a building by a basic network and a bus subnetwork and to integratedly provide integrated communication services to various terminals such as telephone terminals, data terminals, and the like.

SUMMARY OF THE INVENTION

The above conventional technique intends to integratedly manage the application systems which were individually constructed for division. However, in such a system, data having different characteristics commonly use the same communication path. Therefor, for example, a situation easily occurs such that a message exchange which needs to be immediately executed is delayed because of a file transfer which requires a long time. To prevent such a situation, if a communication path of a large capacity is introduced or a complicated control system such as time division or the like is applied, the costs rise and the use efficiency of the communication path deteriorates.

On the other hand, in the conventional technique described above, no consideration is paid to the fact that in the actual activities of the enterprise, the levels and necessary authorities of approvers regarding the transmission and reception of data in one division and the transmission and reception of data between divisions differ. Both of them are equivalently processed. If the above technique is applied to the enterprise information system, the files in a division can be illegally seen or the document can be sent to another divisions without obtaining an approval of the boss in the division. In order to prevent such a wrong situation, a complicated construction for a security protection and the like must be individually formed.

The present invention is made in consideration of the above circumstances and it is an object of the invention to solve the above problems in the conventional technique and to provide an enterprise information system which is suitable to effectively use a fundamental originality of each division and to keep an integration as an organization.

More practically speaking, another object of the invention is to provide an enterprise information system having characteristics (information amount, emergency degree, and the like) of various data flowing on communication path constructing the system and a system construction suitable for the activities of the enterprise.

The above objects of the invention are accomplished by an enterprise information system having work stations, data bases, processors to keep the data bases, and communication paths, wherein the system has: three kinds of data bases comprising a first data base which is used to store information only for use in each of the work stations and has been held in the work station, a second data base which is used to store information which is commonly used by the work stations in a certain division in the enterprise, and a third data base which is used to store information which is transmitted and received between divisions; and three kinds of communication paths comprising a first communication path for directly connecting the work stations among divisions in the enterprise, a second communication path for mutually connecting the work station in a certain division in the enterprise with the second or third data base corresponding to the division or a processor to hold both of the second and third data bases, and a third communication path for mutually connecting the processors to hold the third data bases corresponding to the divisions in the enterprise.

In the enterprise information system according to the present invention, the following three kinds of data bases are first constructed.

(1) Personal data base:

The personal data base is held in each work station and stores information only for use in each work station.

(2) Intradivision data base:

The intradivision data base is held in the processor only for use in division, a characteristic work station in the division, or the like and stores information which is commonly used by the work stations in the relevant division.

(3) Interdivision data base:

The interdivision data base is held in the processor only for use in the division, a characteristic work station in the division, or the like and stores information which is transmitted and received among divisions.

On the other hand, the following three kinds of communication paths are provided.

(1) Informal communication path:

The informal communication path directly connects the work stations among divisions in the relevant enterprise.

(2) Intradivision formal communication path:

The intradivision formal communication path mutually connects each work station in a certain division, a processor to hold the intradivision data base in the relevant division, and a processor to hold the interdivision data base of the relevant division.

(3) Interdivision formal communication path:

The interdivision formal communication path mutually connects processors to hold the interdivision data bases in the relevant enterprise.

A communicating method suitable for the use environment of each communication path is used for the communication paths. For instance, the communicating method to update the data base is preferably used for the intradivision formal communication path. The communicating method to transmit a file is preferably used for the interdivision formal communication path.

The meanings to provide the three kinds of data bases and the three kinds of communication paths are as follows.

Information which is used in the activities of the enterprise is classified into the following three kinds.

(1) Personal data:

The personal data is information such as that held in a personal desk and has a nature in which the individual does not want that his personal data to be seen by another person.

(2) Intradivision data:

The intradivision data is information such that as held in a common cabinet of a certain division and has a nature such that it is troublesome for the data to be accessed from the outside of the division.

(3) Interdivision data:

The interdivision data is information such that as held in a document box on the desk of a responsible person of the division and is formal information which should be transmitted and received to/from the other divisions.

On the other hand, the transmission and reception (communication) in the enterprise activities can be classified into the following three kinds.

(1) Informal communication:

The informal communication relates to the transmission and reception of informal information among individuals such that they are executed with persons in charge of the other divisions by telephone communication.

(2) Intradivision formal communication:

The intradivision formal communication relates the transmission/reception of information in a certain division such that they are executed in the direct conversation in the division, instruction manual, report, or file reference, updating, or the like in a common cabinet.

(3) Interdivision formal communication:

The interdivision formal communication relates to the transmission/reception of formal information with other divisions such that they are executed in the draft plan or the like.

In the present invention, an enterprise information system in the enterprise activities is constructed by using the three kinds of data bases and the three kinds of communication paths and is assigned in correspondence to the three kinds of information and the three kinds of communications in the enterprise activities. Due to this, the intradivision data can be accessed by only the intradivision formal communication path in the relevant division and is not illegally accessed by other divisions. On the other hand, only the information in the interdivision data base can be sent in the interdivision formal communication and the information which is not authorized is not illegally transmitted.

BRIEF DESCRIPTION OF THE DRAWINGS

FIGS. 6 and 7 are diagrams showing examples of constructions of destination tables, respectively;

FIG. 12 is a constructional diagram of an enterprise information system as further another embodiment of the present invention;

FIGS. 14 to 16 are flowcharts showing the operations of the system of FIG. 12.

DESCRIPTION OF THE PREFERRED EMBODIMENTS

An embodiment of the present invention will be described in detail hereinbelow with reference to the drawings. In the embodiment which will be explained hereinbelow, explanation will now be made with respect to an example of an information system in the stock management works in the enterprise having three divisions comprising business offices, a business division of the head office, and factories.

Figure 1:
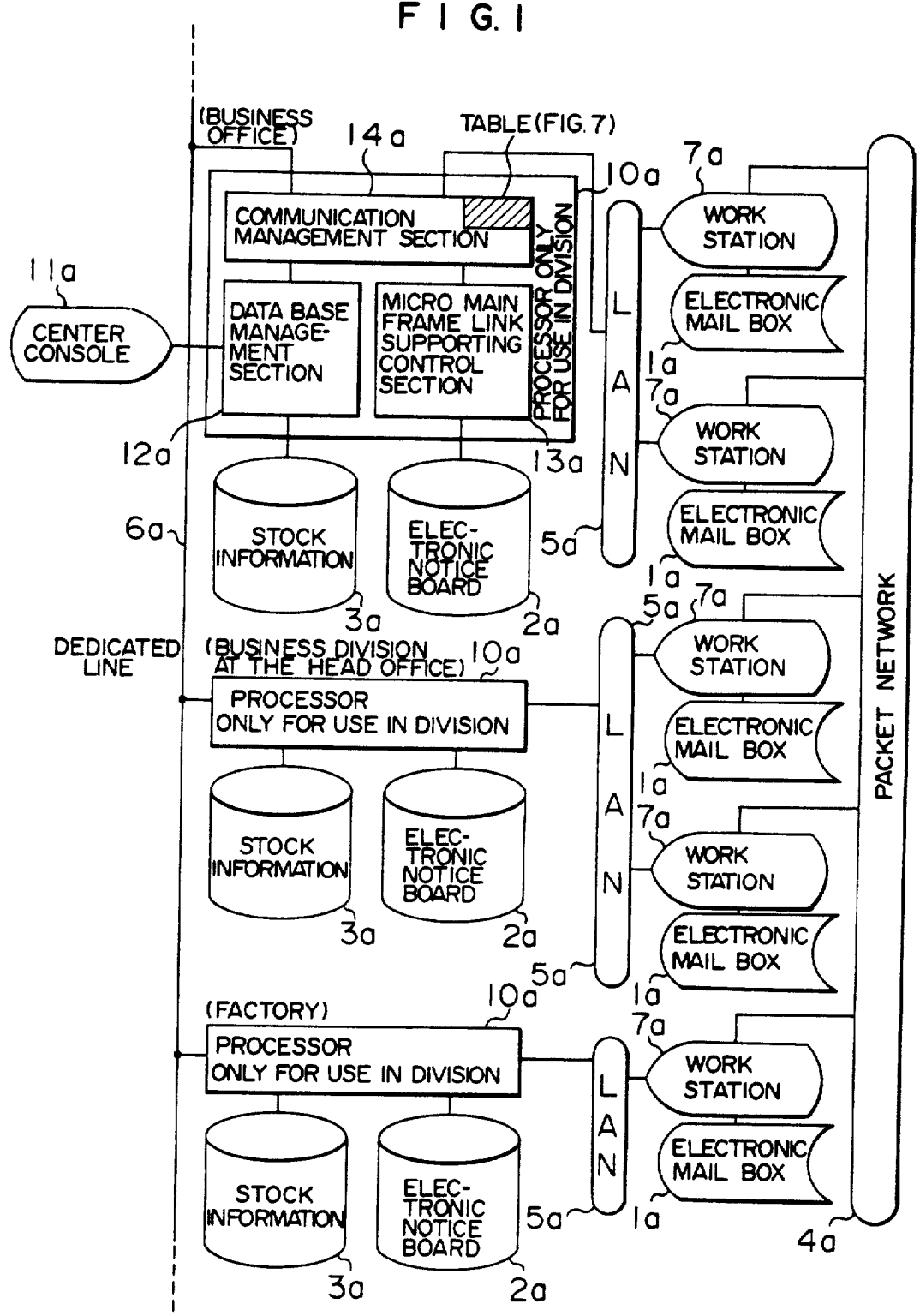
FIG. 1 is a constructional diagram of an enterprise information system as an embodiment of the FIGS. 2 to 5 are flowcharts showing the operations of the system of FIG. 1.

FIG. 1 is a constructional diagram of an enterprise information system according to an embodiment of the present invention. In the diagram, reference numeral 1a denotes a personal data base in which an electronic mail box is stored. The personal data base 1a is held in a work station 7a. Reference numeral 2a denotes an intradivision data base in which an electronic notice (bulletin) board is stored. The intradivision data base 2a is held in a processor 10a only for use in a division, which will be explained subsequently. Reference numeral 3a denotes an interdivision data base in which stock information is stored. The interdivision data base is held in the processor 10a.

Reference numeral 4a denotes an informal communication path using a packet switched network; 5a an intradivision formal communication path using a local area network (LAN); 6a an interdivision formal communication path using special lines connecting business offices; 7a the work station having three functions for the electronic mail exchange, electronic notice board access, and transaction transmission; and 10a the processor only for use in the division. The processor 10a has: a DB (data base) management section 12a to manage an online DB managing system regarding stock information; a micro main frame link supporting control section 13a to execute a micro main frame link supporting system to manage the electronic notice boards and the like; a communication management section 14a for controlling communication with the intradivision formal communication path 5a or the interdivision formal communication path 6a; and the like.

In the embodiment with the above construction, the above three kinds of communication paths are selectively used in the following manner. Explanation will now be made hereinbelow with respect to four kinds.

(a) Stock assignment request:

The work station 7a holds a destination table as shown in FIG. 6 in a self work station. When a person in charge of the business inputs a stock assignment request, the work station 7a operates in the following manner in accordance with a flow of FIG. 2. First, in step 21, the destination table is searched. Since the destination to which the stock assignment request is transmitted is the stock DB managing system, the line number 5, that is, the intradivision formal communication path 5 is selected. Due to this, a stock assignment request transaction is transmitted to the online DB managing system in the processor 10a only for use in the division through the intradivision formal communication path 5 (step 22). At this time, a transmission destination address which is necessary to transmit the transaction and a kind of transmission destination which is necessary to determine a communication procedure are also obtained from the destination table of FIG. 6. When the work station 7a receives a response message for the transmitted request (step 23), a check is made to see if the stock assignment has been succeeded or not on the basis of the content of the response message (step 24). If YES, a message indicative of the completion of the stock assignment is displayed on the screen and if NO, a message indicative of the lack of stocks is displayed (steps 25, 26).

(b) Supplement of stocks:

The supplement of stocks is executed in the following manner independently of the request from the work station 7a. When the supplement of stocks is instructed from the business division of the head office or from the factory, a center operator of the processor 10a inputs such an instruction to the data base management section 12a through a center console 11a. After that, in accordance with the flowchart of FIG. 3, the processor 10a searches the destination table held in a communication management section 14a. The destination table has a format as shown in FIG. 7. The processor 10a selects the line number 6, namely, the interdivision formal communication path 6 from the destination table and transmits a stock supplement transaction to the processor 10a of the business office in which the stocks will be supplemented (steps 31, 32).

(c) Electronic mail transmission request:

When an electronic mail transmission request is received, the work station 7a operates in the following manner in accordance with a flowchart of FIG. 4. First, in step 41, the destination table shown in FIG. 6 is searched. Although each work station has been registered in the destination table, all of the corresponding lines relate to the informal communication path 4. Due to this, the work station 7a selects the informal communication path 4 and transmits a mail (step 42). The work station which received the transmission receives the mail and stores into the electronic mail box (steps 43, 44).

Figure 5:
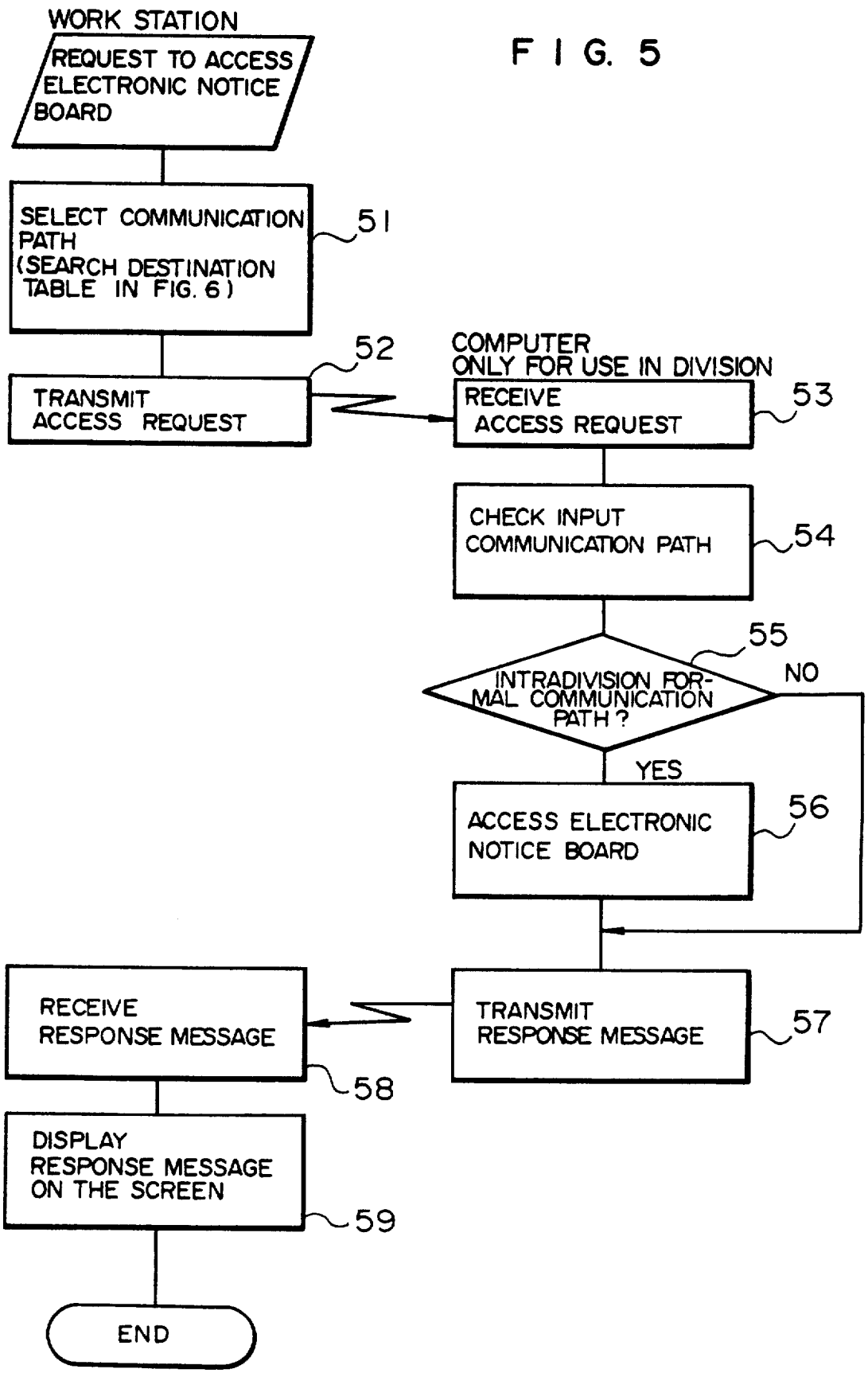

(d) Electronic notice board access request:

When an electronic notice board access request is received, the work station 7a operates in the following manner in accordance with a flowchart of FIG. 5. First, in step 51, the destination table shown in FIG. 6 is searched. Due to this, the work station 7a selects the intradivision formal communication path 5 and transmits the electronic notice board access request to the electronic notice board managing system in the processor 10a (step 52). In the processor 10a, such an access request is received in the communication management section 14a (step 53). Then, the input communication path is checked. If it is the intradivision formal communication path 5a, the electronic notice board access request is transferred to the micro main frame link supporting control section 13a, by which the electronic notice board is accessed (steps 54 to 56). A response message is made in accordance with the result of the access and is transmitted to the requesting side work station 7a by the communication management section 14a (step 57). The work station 7a on the requesting side receives the response message and displays it on the screen (steps 58, 59).

According to the embodiment, the following advantages are obtained. First, the lines are selectively used in accordance with the use object and a signal regarding the regular stock supplement flows in the dedicated line and an amount of communication is relatively constant, so that a use efficiency of the dedicated line in which a fundamental fee is comparatively high can be raised. Second, in addition to the stock managing system by the ordinary online data base, the work station 7a has the functions of both of the electronic mail and the electronic notice board access, so that it is possible to flexibly cope with the stock management. This means that, for instance, if the stock assignment has failed, that is, if the stocks lack or the like, the stocks can be also supplemented from the other division, but if an emergency is requested, the person in charge of the business can also request the person in charge of the other division to supplement the stocks by using an electronic mail. On the other hand, if the stocks which had once been assigned became unnecessary, the stocks are informed by the electronic notice board of the business office without returning them and can be also freely used in the self business office. Since the work stations of the other divisions are not connected to the processor only for use in the self division, the content of the notice board is not seen from the work stations of the other divisions.

The second embodiment of the invention will now be described. In the embodiment which will be explained hereinbelow, explanation will be made with respect to an example of a system which is used for the support to make design information regarding new products and the transfer works in an enterprise having three divisions comprising a product planning division, a design division, and manufacturing division.

Figure 8:
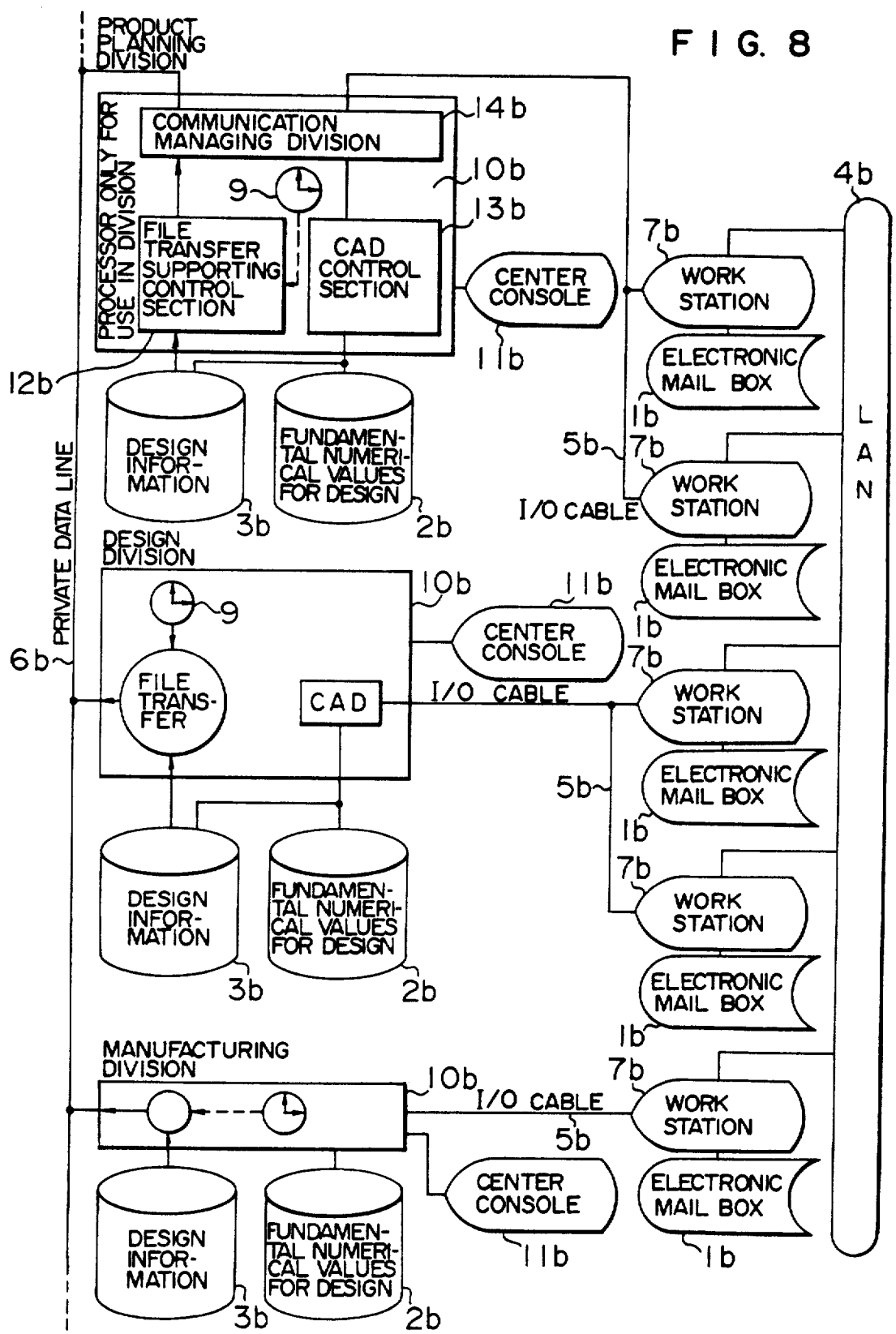
FIG. 8 is a constructional diagram of an enterprise information system as another embodiment of the present invention.

FIG. 8 is a constructional diagram of an enterprise information system according to the second embodiment. In the diagram, reference numeral 1b denotes a personal data base. In a manner similar to the personal data base 1a, an electronic mail box is stored in the personal data base 1b. The personal data base 1b is held in a work station 7b. Reference numeral 2b denotes an intradivision data base. Information peculiar to the division, for instance, in the case of the design division, fundamental numerical values for design are stored in the intradivision data base 2b. The intradivision data base 2b is held in a processor 10b only for use in the division, which will be explained hereinlater. Reference numeral 3b indicates an interdivision data base in which design information which is transmitted and received among divisions is stored in the interdivision data base 3b. The interdivision data base 3b is held in the processor 10b.

Reference numeral 4b indicates an informal communication path using the foregoing LAN; 5b denotes an intradivision formal communication path using input-/output cables of the processor 10b; 6b an interdivision formal communication path using private data lines; and 7b the work station having the function to exchange electronic mails and the unique function of the division, for instance, the function of the CAD (Computer Aided Design) terminal in the case of the design division. Reference numeral 9 indicates a clock provided in the processor 10b. The clock 9 has the function to execute a timer interruption to the processor 10b.

On the other hand, the processor 10b only for use in the division has: a file transfer supporting control section 12b having the file transfer function; a CAD control section 13b having the unique function of the division, for instance, the CAD function in the case of the design division; a communication management section 14b for controlling the communication with the intradivision formal communication path 5b or the interdivision formal communication path 6b; and the like.

In the embodiment with the foregoing construction, the three kinds of communication paths are selectively used in the following manner.

Figure 9:
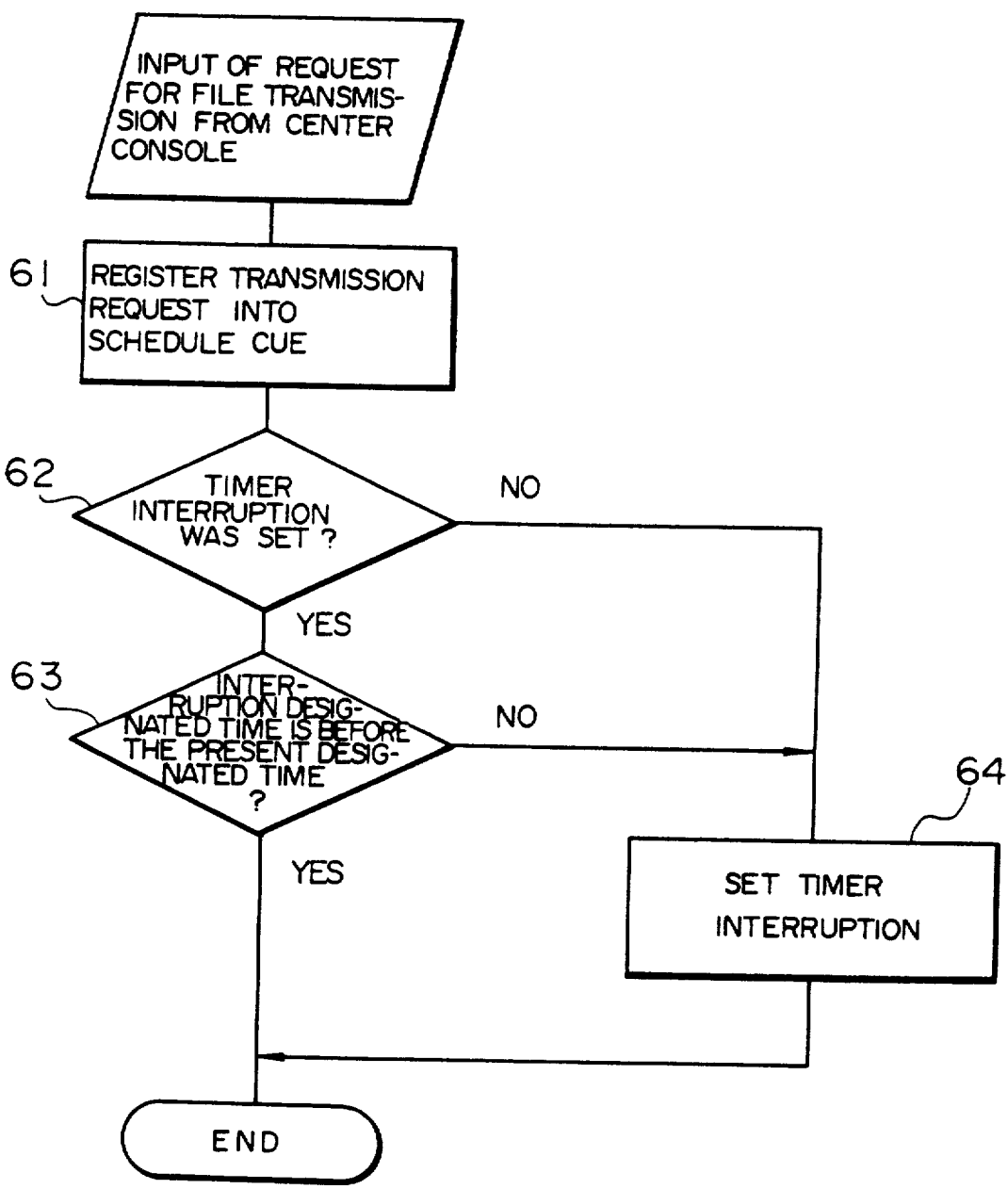
FIGS. 9 and 11 are flowcharts showing the operations of the system of FIG. 8.
Figure 10:
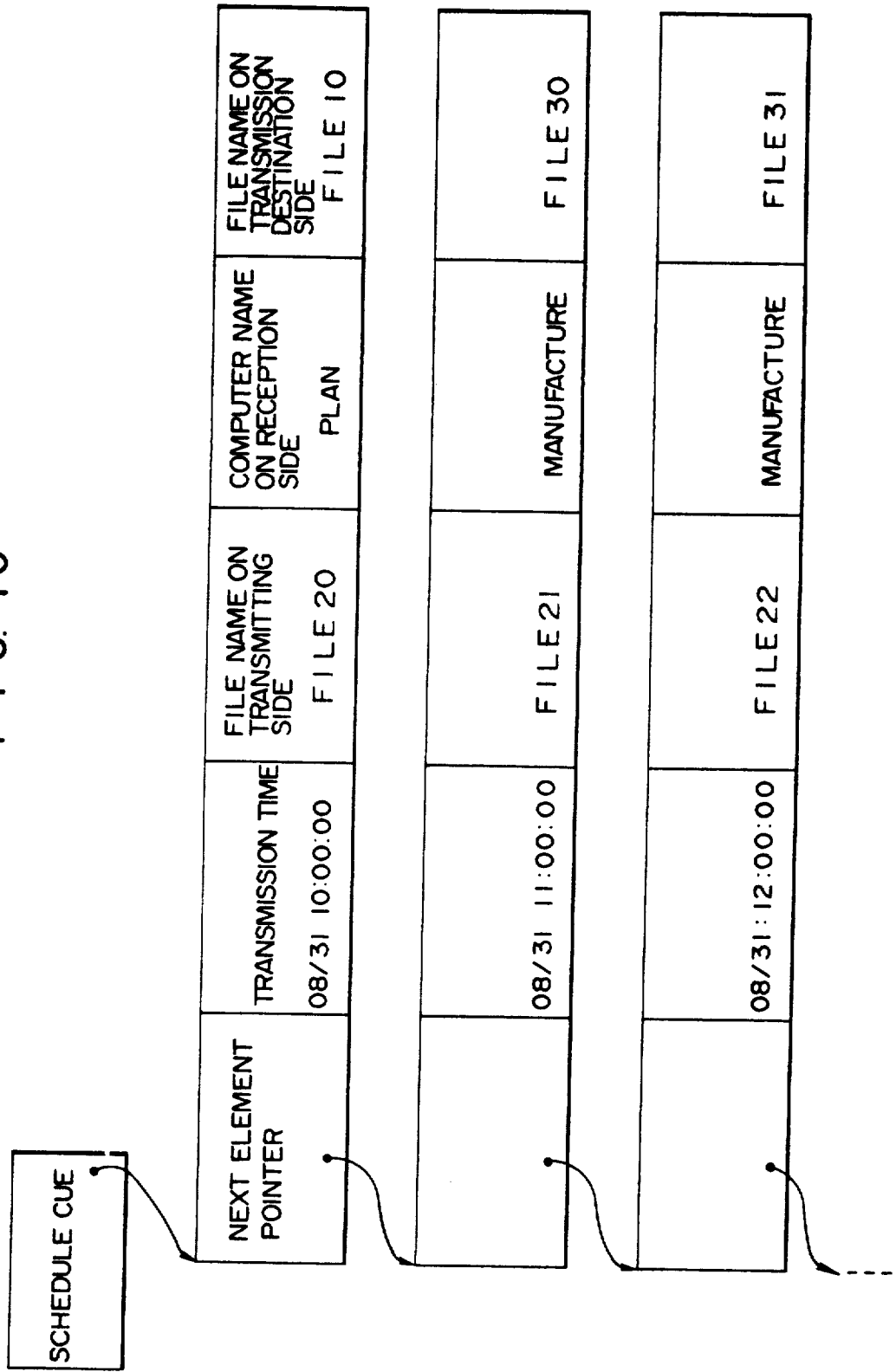
FIG. 10 is a diagram showing an example of a data structure.

The time to execute the file transmission is input from a center console 11b of the processor 10b. At this time, in accordance with a procedure shown in FIG. 9, the processor 10b registers the transmission request to a schedule cue (step 61) and sets the timer interruption as necessary, that is, in the case where the timer interruption is not set or where the designated time of the timer interruption which was set is later than the present designated time (steps 62 to 64). The schedule cue has a list format as shown in FIG. 10 and is held in a main memory of the processor 10b. The schedule cue has a time to be transmitted, a file name on the transmitting side, a processor name (division name) on the reception side, a file name on the transmission destination side, and the like.

Figure 11:
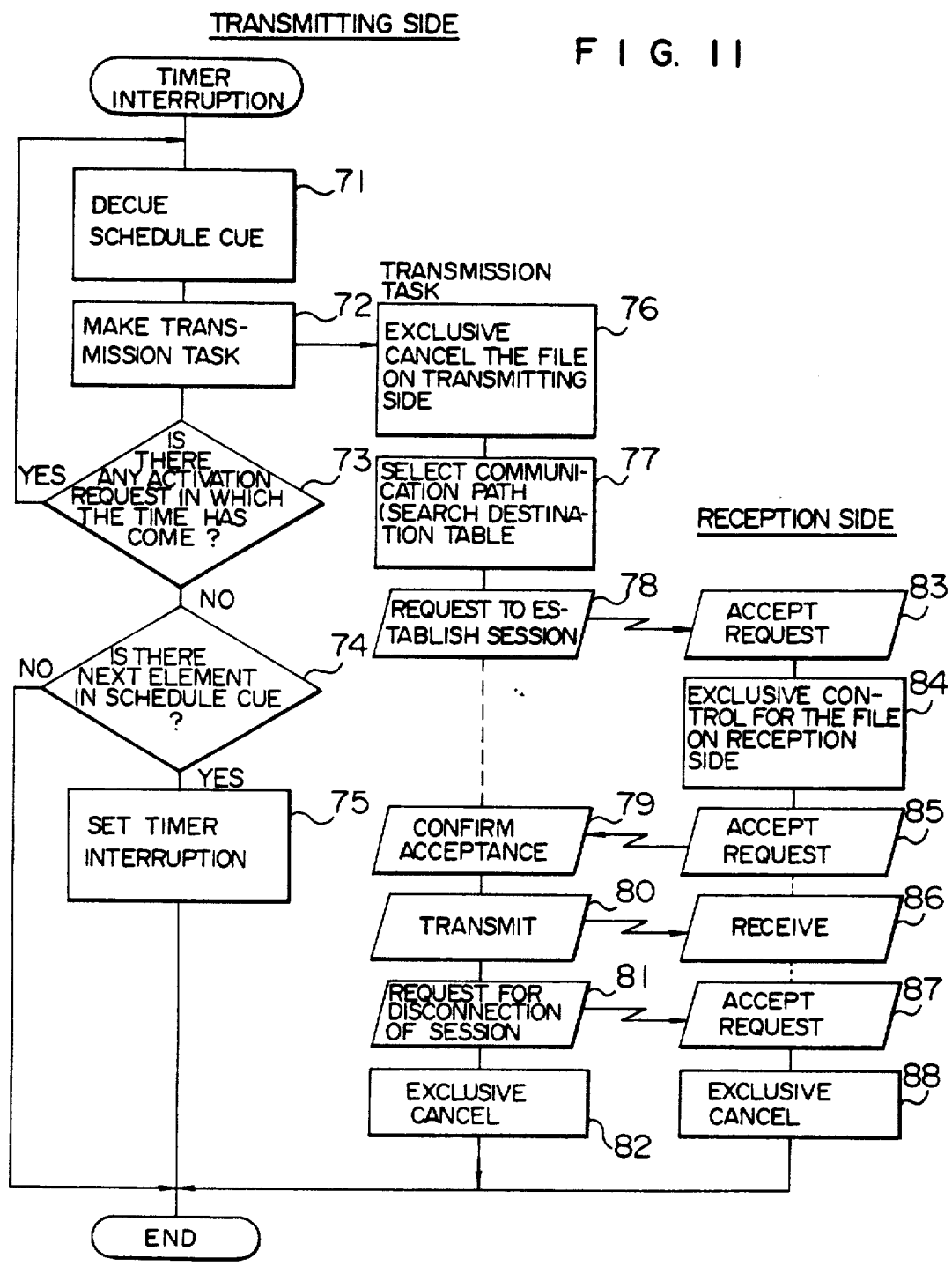

When the designated time has come, the timer interruption is generated by the function of the clock 9. In response to the timer interruption, the processor 10b operates in the following manner (refer to FIG. 11). First, the head element of the schedule cue is decued (step 71). On the basis of it, a transmission task is formed (step 72). If any other activation requests in which the activation times have come are input, tasks are also made for them (steps 73, 71, 72).

In the activated transmission task, after the transmitting side file has been exclusively controlled (step 76), the communication path is selected by the table search in a manner similar to the foregoing embodiment (in this case, the interdivision formal communication path 6 is selected; step 77). An establishment of a session is requested to the processor only for use in the division on the reception side through the communication path (step 78). On the reception side, if such a request has been received (step 83), the exclusive control of the file on the reception side is executed (step 84). After that, the transmitting side is infomed of a message indicative of the acceptance of the request (step 85). When the message has been confirmed on the transmitting side (step 79), data is transmitted (step 80) and the data is received on the reception side (step 86).

After completion of the transmission of all data, the transmitting side transmits a session disconnection request (step 81). Thereafter, the exclusive control is cancelled (step 82). On the other hand, on the reception side, the session disconnection request is accepted (step 87) and the exclusive control is cancelled (step 88).

According to the embodiment, the following advantages are obtained. First, the data transmission and reception among divisions, for instance, the transfer of the fundamental concept of the product from the product planning division to the design division, the transfer of the detailed design results from the design division to the manufacturing division, or the like can be executed without passing through operators. Further, their delivery terms can also be automatically managed. Second, by using the input/output cables for the communication paths of the CAD which handles a large amount of information, the communicating time of the CAD data can be reduced and no adverse influence is exerted on the other communications. Third, since the data transmission and reception among divisions are executed by a relatively simple file transmission of the protocol, the independency of the system of each processor only for use in the division can be held. Each processor only for use in the division can be designed to a type which is considered to be best for the relevant division.

The third embodiment of the invention will now be described. In the embodiment which will be explained hereinbelow, explanation will be made with respect to an example of a system which is used for the document processing works associated with the orders or materials and the like in an enterprise having an ordering division and two managing departments of a material division and an accounting division. In the embodiment, one of the work stations is designated as a privilege work station and a control is performed so that the writing into the interdivision data base cannot be executed from the work stations other than the privilege work station.

FIG. 12 is a constructional diagram of an enterprise information system according to the embodiment. In the diagram, reference numeral 1c denotes a personal data base in which the document which is being made by each person is stored. The personal data base 1c is held in a work station 7c or a privilege work station 8c. Reference numeral 2c denotes an intradivision data base. The document such that the tracing of the document flowing on an interdivision formal communication path 6c and the process of the person in charge of each division were finished and the "decision" of the boss of the division is waited is stored in the intradivision data base 2c. The intradivision data base 2c is held in the privilege work station 8c, which will be explained hereinafter. As will be described, the operation such that the boss of the division transfers the "decision" waiting document from the intradivision data base 2c to an interdivision data base 3c in the privilege work station 8c corresponds to the ordinary "decision".

Reference numeral 3c denotes the interdivision data base. The document which is not processed yet in the division, that is, the document which has just arrived from the other division and the document in which the processes in the division including the "decision" of the boss of the division were completed are stored in the interdivision data base 3c. The interdivision data base 3c is held in the privilege work station 8c. Reference numeral 4c denotes an informal communication path using a private telephone network. Reference numeral 5c denotes an intradivision formal communication path using a LAN of a short distance which was limited in the floor. Reference numeral 6c indicates the interdivision formal communication path using a LAN of a long distance existing among the floors.

Reference numeral 7c denotes the work station having the functions to process documents and to transmit and receive documents. Reference numeral 8c indicates the privilege work station. The privilege work station 8c includes: a document management control section 12c for managing the document which is being made in the personal data base 1c by each person, the intradivision data base 2c in which the document such that the tracing of the document flowing on the interdivision formal communication path 6c and the process of the person in charge of each division were finished and the "decision" of the boss of the division is waiting is stored, and the interdivision data base 3c in which the document which is not processed yet in the relevant division, that is, the document which has just arrived from the other division and the document such that the processes in the division including the "decision" of the boss of the division were completed are stored; a document input/output control section 13c to manage the input/output of each of the above documents; a communication management section 14c to control the communication with the informal communication path 4c, intradivision formal communication path 5c, or interdivision formal communication path 6c; and the like.

Figure 13:
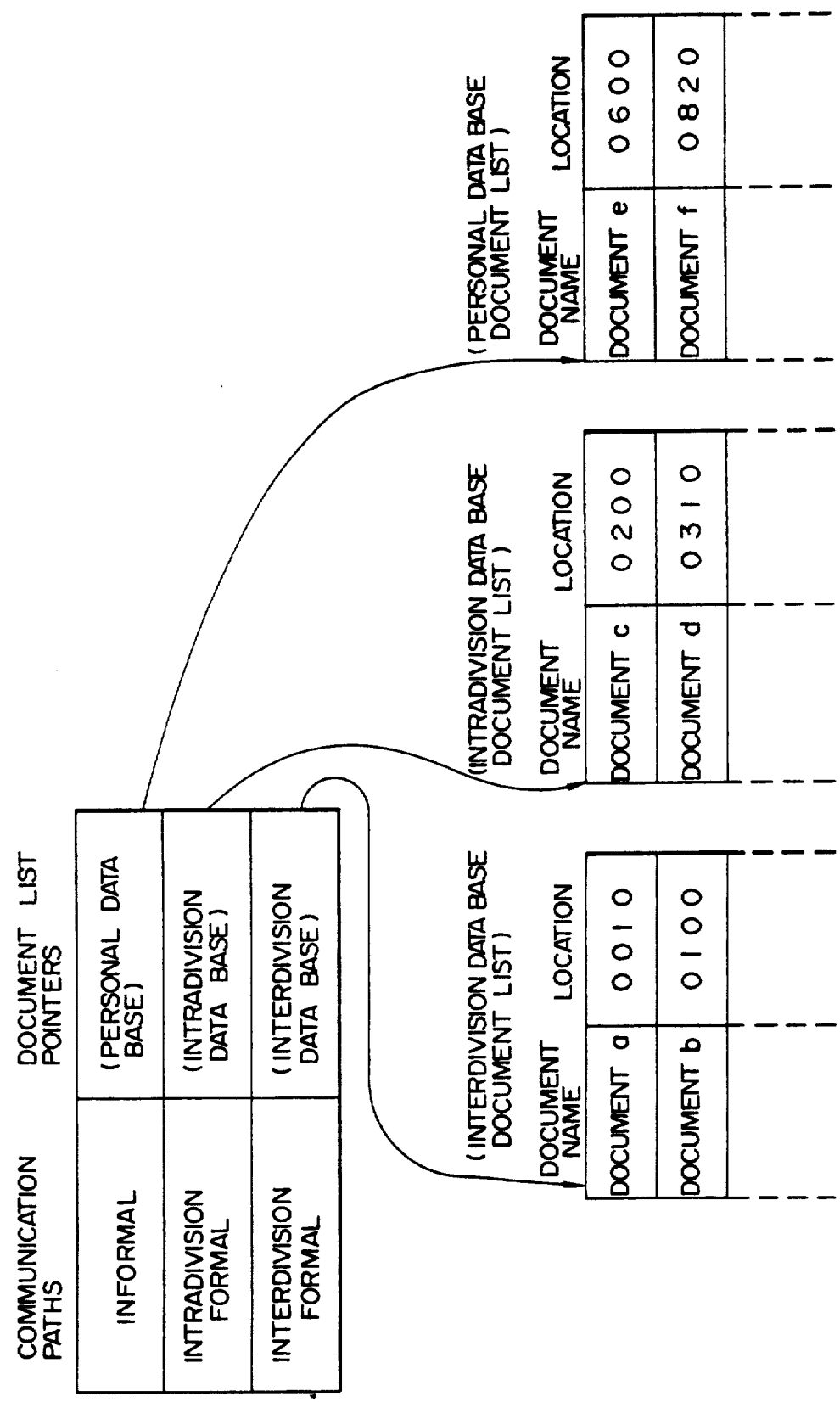
FIG. 13 is a diagram showing an example of a control table structure.
Figure 14:
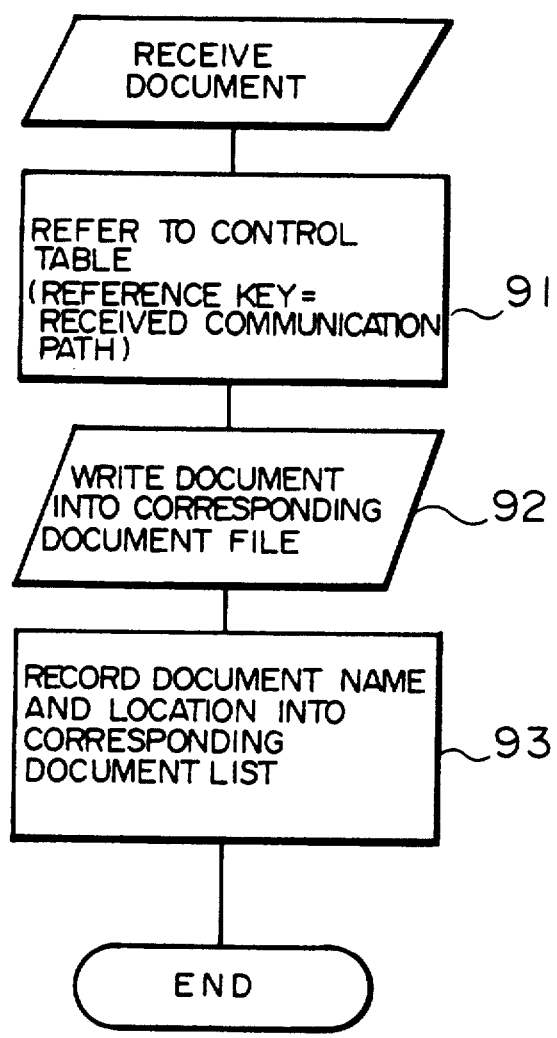

The privilege work station 8c has a control table of a format shown in FIG. 13 in order to correspond the communication paths to the document files. The control table of the format shown in FIG. 13 is used to three cases of reception, reference, and transmission of documents. That is, when documents are received, in accordance with an operation flow shown in FIG. 14, the privilege work station 8c refers to the control table (step 91) and writes the document into the document file in the corresponding data base (step 92) and records the name of the document and its location (storage location) into the corresponding document list (step 93).

On the other hand, when a request to refer to the document is received from the other work station, in accordance with an operation flow shown in FIG. 15, the control table is referred (step 94), the designated document is searched from the document list in the corresponding data base (step 95), and the searched document is transmitted to the work station on the requesting side (steps 96, 97). At this time, if the designated document does not exist in the list, this fact is informed as an error to the work station on the requesting side (steps 96, 98). When the user of the privilege work station 8c instructs the transmission of the document, in accordance with an operation flow shown in FIG. 16, the privilege work station 8c refers to the control table by the communication path which was designated by the user (step 101) and the designated document is searched from the document list in the corresponding data base and is transmitted (steps 102, 103). In this case, if the designated communication path is the interdivision formal communication path 6c, the transmitted document is copied into a trace file (steps 104, 105).

In the above embodiment, the control such that the writing into the interdivision data base 3c from the work stations 7c other than the privilege work station cannot be executed is performed in the following manner.

As mentioned above, the interdivision data base 3c is held in the privilege work station 8c. Therefore, although the privilege work station 8c can directly write data into the interdivision data base 3c, each of the other work stations 7c needs to transmit the document by using either one of the communication paths. At this time, since only the informal communication path 4c and the intradivision formal communication path 5c are connected to the work stations 7c, either one of them is used. However, in the privilege work station 8c, the documents which were received from those communication paths are stored into the personal data base 1c and the intradivision data base 2c, respectively. Consequently, the writing into the interdivision data base 3c cannot be performed.

In the above embodiment, all of the selections of the communication paths are executed by the user. When the users of the privilege work station 8c request to transmit the document or to refer to the documents in the other work stations, they designate either one of the three kinds of communication paths to be used. Since the interdivision formal communication path 6c is not connected to the work stations 7c other than the privilege work station 8c, the users designate either one of the other two kinds of communication paths.

Figure 16:
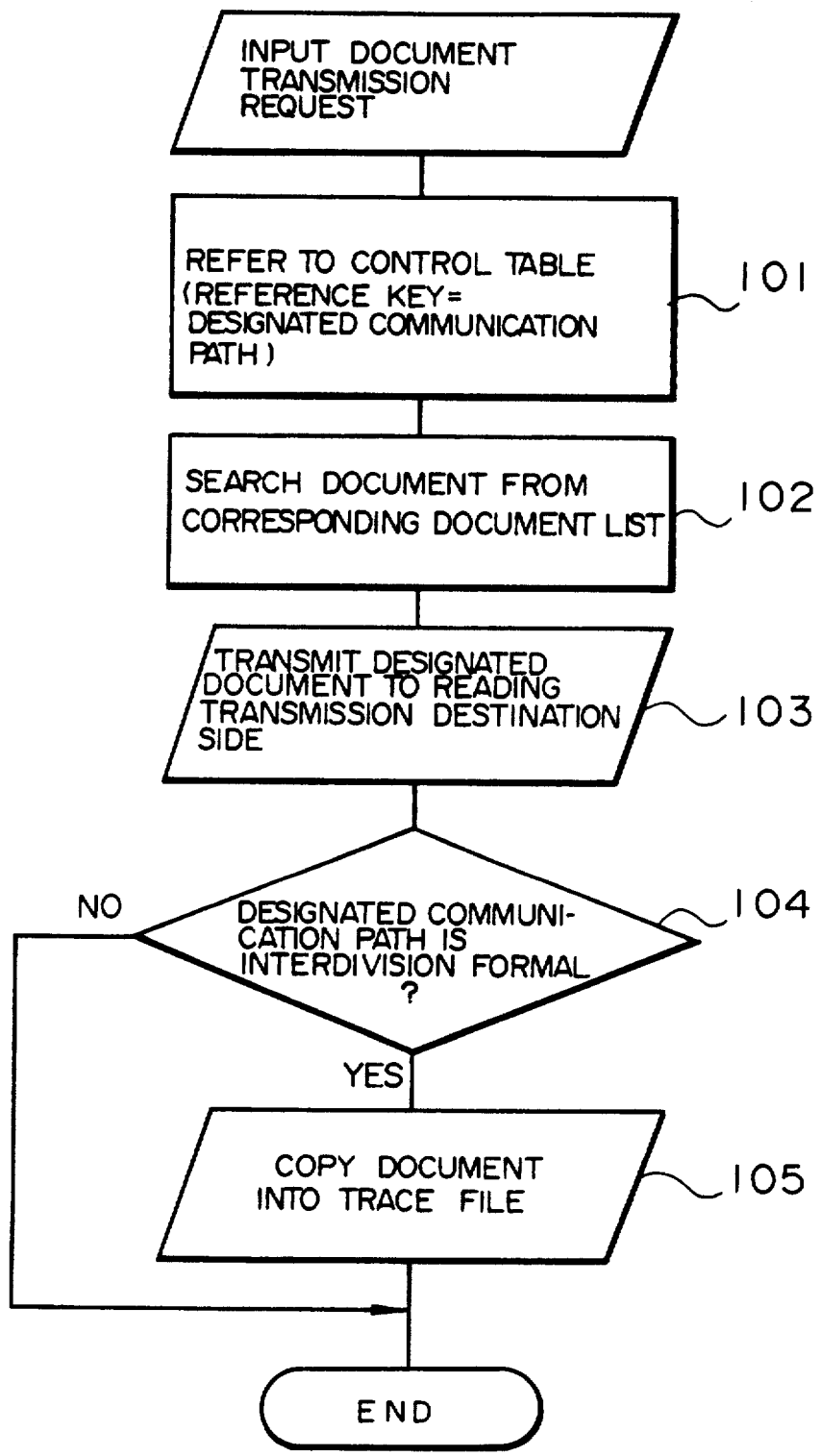

In the embodiment, when the privilege work station 8c transmits the document via the interdivision formal communication path 6c, the copy of the document is automatically written into the trace file in the intradivision data base 2c (steps 104 and 105 in FIG. 16).

According to the embodiment, the following advantages are obtained. First, the flow of the documents due to the order of materials and the like can be naturally supported. That is, the privilege work station 8c naturally corresponds to the boss of the division. The interdivision data base 3c naturally corresponds to the document box on the desk of the boss of the division. The trace file naturally corresponds to the binder to bind the copies of the documents which passed through the relevant division. The document which is being made naturally corresponds to the document on the desk of each person. In the embodiment, the work stations 7c other than the privilege work station 8c cannot write into the interdivision data base 3c. Therefore, when the formal documents are sent to the other divisions, the users of the work stations 7c other than the privilege work station 8c once write the relevant documents into the intradivision data base 2c and, thereafter, the relevant documents are transferred to the interdivision data base 3c by the boss of the division. The operation such that the boss of the division transfers the documents from the intradivision data base 2c to the interdivision data base 3c corresponds to the "decision". On the other hand, according to the embodiment, the formal documents which are sent to the other divisions are certainly subjected to the "decision" by the boss of the division, while the informal documents can be transmitted and received by the informal communication path 4c.

Second, the communication in the division of a large information transfer amount flows in the short distance LAN, while only a small number of formal documents flow in the LAN of a long distance LAN. Therefore, an information amount is reduced and the costs of the facilities can be saved. Third, since only the formal documents flow in the interdivision formal communication path 6c, by taking the journal, the history of the transmission and reception of the formal documents can be preserved by a small tracing amount and the responsibility of each division can be clarified.

Each of the above embodiments has been shown as an example of the present invention. The invention is obviously not limited to those embodiments.

As described in detail above, according to the present invention, an enterprise information system includes: three kinds of data bases comprising a first data base which is used to store information only for use in each work station and is head in the work station, a second data base to store the information which is commonly used by the work stations in a certain division of the enterprise, and a third data base to store information which is transmitted and received among the divisions; and three kinds of communication paths comprising a first communication path for directly connecting the work stations in the enterprise among the divisions, a second communication path for mutually connecting the work station in a certain division of the enterprise with a processor to hold the second data base or the third data base corresponding to the division or both of the second and third data bases, and a third communication path for mutually connecting the processors to hold the third data bases corresponding to the divisions in the enterprise. Therefore, there is a typical advantage such that it is possible to realize an enterprise information system which is suitable to keep a combination as an organization while making the most of the fundamental originality of each division. More practically speaking, an advantage is obtained such that it is possible to realize an enterprise information system having a system construction suitable for the characteristics of various kinds of data flowing on the communication paths constructing the system and the meanings in the activities of the enterprise.

What is claimed is:

1. An enterprise information system for an enterprise including a plurality of divisions, said enterprise information system comprising:

a plurality of work stations;

a plurality of processors;

a plurality of data bases controlled by said plurality of work stations and said plurality of processors, said plurality of data bases including a plurality of data bases of a first type each controlled by one of the work stations to store information dedicated to said one of the work stations, a plurality of data bases of a second type, each of said plurality of data bases of said second type corresponding to a respective one of said plurality of divisions of the enterprise, said data bases of said second type each controlled by one of the processors to store information commonly used by one or more of the work stations connected to said one of the processors wherein said one of the processors and said one or more of the work stations belong in said respective one of said plurality of divisions of the enterprise, and a plurality of data bases of a third type, each of said plurality of data bases of said third type corresponding to a respective one of said plurality of divisions of the enterprise, said data bases of the third type controlled by each of the processors to store information which is transmitted and received among a plurality of the divisions; and a plurality of communication paths including a first type communication path for interconnecting all of the work stations of the enterprise, a plurality of second type communication paths, each of said plurality of second type communication paths corresponding to a respective one of said plurality of divisions, each of said second type communication paths connecting within the respective one of said plurality of divisions the work stations belonging to the respective division with the processor controlling the second type data base of that division, and a third type communication path, the third type communication path mutually connecting all of the processors controlling said plurality of data bases of the third type, wherein said first, second and third communication paths are different from each other;

wherein said work stations transmit/receive data on the first type data base to/from another work station through said first type communication path and access the second type data base of the processor belonging to the division to which said work station belongs through said second type communication path corresponding to that division; and wherein said processors transmit/receive data on the third type data base to/from another of said processors through said third type communication path.

2. A system according to claim 1, each of said work stations further comprising a table which stores information relating to said three types of data bases and said communication paths, and indicating which communication path of said first, second and third communication paths should be used for a particular destination.

3. A system according to claim 2, further comprising means for designating to at least one of said plurality of processors a time to transmit data via the third communication path.

4. A system according to claim 2, wherein each of said plurality of processors is a privileged work station connected to work stations belonging in the division to which that processor belongs through the second communication path for controlling the second and third data bases.

5. A system according to claim 1, each of said processors further comprising a table which stores information relating to said three types of data bases and said communication paths, and indicating which communication path of said first, second and third communication paths should be used for a particular destination to hold the second data base or the third data base or both of said second and third data bases.

6. A system according to claim 3, further comprising means for designating to at least one of said plurality of processors a time to transmit data via the third communication path.

7. A system according to claim 3, wherein each of said plurality of processors is a privileged work station connected to work stations belonging in the division to which that processor belongs through the second communication path for controlling the second and third data bases.

8. A system according to claim 1, further comprising means for designating to at least one of said plurality of processors a time to transmit data via the third communication path.

9. A system according to claim 4, wherein each of said plurality of processors is a privileged work station connected to work stations belonging in the division to which that processor belongs through the second communication path for controlling the second and third data bases.

10. A system according to claim 1, wherein each of said plurality of processors is a privileged work station connected to work stations belonging in the division to which that processor belongs through the second communication path for controlling the second and third data bases.

* * * * *

UNITED STATES PATENT AND TRADEMARK OFFICE
CERTIFICATE OF CORRECTION

PATENT NO. : 5,282,273

DATED : January 25, 1994

INVENTOR(S) : Tetsuya USHIO et al

It is certified that error appears in the above-indentified patent and that said Letters Patent is hereby corrected as shown below:

It is certified that error appears in the above identified patent and that said Letters Patent is hereby corrected as shown below:

| Column | Line | |
|---|---|---|
| 1 | 18 | After "in" insert --the--. |
| 1 | 37 | Before "provide" delete " integratedly". |
| 3 | 16 | After "want" delete "that". |
| 3 | 19 | Change "such that as" to --such as that--. |
| 3 | 22 | After "from" delete "the". |
| 3 | 24 | Change "such that as" to --such as that--. |
| 4 | 47 | Change "only for use" to --for use only--. |
| 5 | 14 | After "has" delete "been". |
| 8 | 35 | Delete "is waited". |
| 10 | 3 | Delete "either". |
| 10 | 45 | Delete "LAN of a". |

Signed and Sealed this

Nineteenth Day of July, 1994

Attest:

BRUCE LEHMAN

*Attesting Officer*       *Commissioner of Patents and Trademarks*